US010671412B1

(12) United States Patent
Radu-Bogdan et al.

(10) Patent No.: US 10,671,412 B1
(45) Date of Patent: Jun. 2, 2020

(54) FAST CLONING FOR BACKGROUND PROCESSES IN SCRIPTING ENVIRONMENTS

(71) Applicant: Adobe Inc., San Jose, CA (US)

(72) Inventors: Stavila Radu-Bogdan, Ilfov (RO); Grecescu Ioan Vladimir, Bucharest (RO)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/360,340

(22) Filed: Mar. 21, 2019

(51) Int. Cl.
*G06F 9/44* (2018.01)
*G06F 9/448* (2018.01)
*G06F 9/455* (2018.01)
*G06F 9/451* (2018.01)

(52) U.S. Cl.
CPC ............ *G06F 9/4488* (2018.02); *G06F 9/451* (2018.02); *G06F 9/45529* (2013.01)

(58) Field of Classification Search
None
See application file for complete search history.

(56) References Cited

U.S. PATENT DOCUMENTS

| | | | | |
|---|---|---|---|---|
| 8,171,499 B2* | 5/2012 | Allen | ...................... | G06F 9/542 711/1 |
| 2002/0046298 A1* | 4/2002 | Bak | ..................... | G06F 9/30174 719/310 |
| 2012/0089820 A1* | 4/2012 | Nair | .................... | G06F 9/45504 712/227 |
| 2012/0110574 A1* | 5/2012 | Kumar | ................ | G06F 9/45558 718/1 |
| 2015/0142854 A1* | 5/2015 | Seth | ....................... | G06F 9/4493 707/798 |
| 2016/0048427 A1* | 2/2016 | Sasi | ....................... | G06F 16/184 707/646 |
| 2016/0048428 A1* | 2/2016 | Kanteti | ................. | G06F 16/184 707/646 |
| 2017/0115840 A1* | 4/2017 | Goodson | ................. | G06F 9/451 |
| 2017/0249197 A1* | 8/2017 | Qu | ......................... | G06F 9/541 |
| 2017/0315739 A1* | 11/2017 | Ratra | .................... | G06F 3/0619 |

(Continued)

OTHER PUBLICATIONS

"Implementing multi-threaded in the IT aspects:: [JavaScript] Web Worker to implement a multi-threaded Web Worker in the web", 2017 (Year: 2017).*

(Continued)

*Primary Examiner* — Insun Kang
(74) *Attorney, Agent, or Firm* — Finch & Maloney PLLC

(57) ABSTRACT

A programmable device including a memory and at least one processor coupled to the memory is provided. The memory stores a plurality hybrid objects. Each hybrid object of the plurality of hybrid objects includes a native object wrapped by an interpreted object. The at least one processor can be coupled to the memory. The at least one processor can be configured to identify a message to execute an operation on one or more hybrid objects of the plurality of hybrid objects; clone, in response to reception of the message, each native object within the one or more hybrid objects to create one or more cloned native objects; wrap each cloned native object of the one or more native objects with a new interpreted object to create one or more new hybrid objects; and execute the operation on the one or more new hybrid objects.

20 Claims, 7 Drawing Sheets

(56) References Cited

U.S. PATENT DOCUMENTS

2018/0285026 A1* 10/2018 Goto ................... G06F 3/121
2019/0370014 A1* 12/2019 Pesarese ............. G06F 16/289

OTHER PUBLICATIONS

"Using web workers: working smarter, not harder", Mozilla.org, Jul. 8, 2009 (Year: 2009).*

"Node.js v11.12.0 Documentation", retrieved online on Mar. 21, 2019, URL: https://nodejs.org/api/addons.html, 26 pages.

"Iframe: The Inline Frame Element", retrieved online Mar. 21, 2019, URL: https://developer.mozilla.org/en-US/docs/Web/HTML/Element/iframe, 27 pages.

"Using Web Workers", Retrieved online Mar. 21, 2019, URL: https://developer.mozilla.org/en-US/docs/Web/API/Web_Workers_API/Using_web_work, 27 pages.

"Node.js v11.12.0 Documentation Worker Threads", retrived online Mar. 21, 2019, URL: https://nodejs.org/api/worker_threads.html, 9 pages.

* cited by examiner

FAST CLONING FOR BACKGROUND PROCESSES IN SCRIPTING ENVIRONMENTS

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

FIELD OF THE DISCLOSURE

This disclosure relates to techniques of decreasing latency in user applications, and more particularly, to techniques of executing background processing to decrease latency.

BACKGROUND

Scripting languages are programming languages that can control other software components. Using a scripting language, a software developer can write a scripting program that leverages functionality present in software components to perform highly functional tasks. For example, a software developer can write a scripting program that controls operation of a web browser and/or server to provide a user interface with a deep set of features. In general, such a scripting program can be written in less time than a non-scripting program to provide the same feature set because the non-scripting program cannot as easily leverage the underlying functionality of the web browser and/or server. Thus, scripting languages generally have a positive impact on software developer productivity.

Due to their ability to control other software components, scripting programs must be executed within a specialized execution environment that includes the software components they control. While such reliance can be viewed as a limitation to the portability of scripting programs, where the controlled software components are common, such reliance may actually increase the portability of scripting program. For instance, one example of a scripting language that has gained widespread acceptance is JavaScript, which can be used to control operations of browsers. Due to the nearly ubiquitous nature of browsers, JavaScript programs can be executed on most computing devices.

Scripting programs are not without disadvantages. For instance, during execution, scripting programs are generally interpreted, line by line, from either source code or non-compiled intermediate code. This interpretation process requires computing resource and puts scripting programs at a disadvantage to programs that are compiled into natively executable code. This is so because natively executable code can be executed by the underlying computing hardware without an intervening interpreter. Thus, in general, interpreted programs, such as scripting programs, execute more slowly than natively executable programs that perform comparable functionality. This relatively slow execution speed can be compounded by the fact that interpreters are single-threaded and, therefore, sequentially execute instructions within scripting programs.

DETAILED DESCRIPTION

Figure 1:
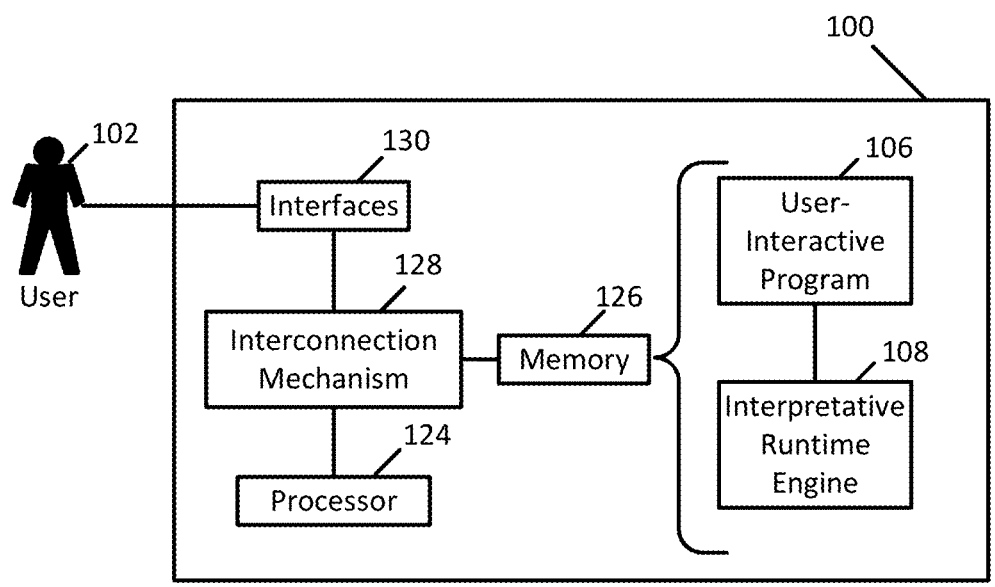
FIG. 1 is a block diagram illustrating an example programmable device configured to execute a user-interactive program in accordance with one or more examples of the present disclosure.

In a single-threaded execution environment, such as established by an interpreter, protracted operations that require substantial processor time to complete may cause the program to become unresponsive while execution of the protracted operation is completed. In some situations, this latency period is acceptable because it is expected by the user. For instance, when a user selects a control to save their work within a program, the user expects some latency while the program executes a save operation. However, in other situations, latency can be undesirable. For example, where a program attempts to autosave a user's work for crash recovery purposes, the user may not expect latency during the autosave operation. If noticeable latency is present during an autosave, it can frustrate the user and decrease user productivity—especially where the autosave is configured for frequent execution.

Thus, and in accordance with examples disclosed herein, systems and methods are provided that concurrently execute foreground and background processes via interpreted code. The foreground processes can be user-interactive in that they can implement the user interface of a program. The background processes can be non-interactive and, therefore, can be executed without user knowledge or involvement. Thus, using the systems and methods disclosed herein, a program can execute, for example, an interpreted autosave operation that consumes substantial processor time without introducing undesirable latency.

To aid the reader's understanding of various example examples disclosed herein, some terminology used to describe these examples will now be presented. As used herein, an object refers to, in addition to its ordinary meaning, a programmatic construct that associates data with instructions configured to manipulate the data. Elements of data under the control of an object are referred to as properties of the object. Instructions executed via the object can be referred to as methods of the object. Properties and methods of an object may be private (e.g., inaccessible by other programmatic entities) or may be accessible via an interface exposed by the object. As used herein, a native object refers to, in addition to its ordinary meaning, an object with methods that are compiled for direct execution by computing hardware, such as a processor. As used herein, an interpreted object refers to, in addition to its ordinary meaning, an object that is instantiated and managed by an interpretative runtime engine, such as the V8 JavaScript engine. As used herein, a hybrid object refers to, in addition to its ordinary meaning, an object that includes a native object that is wrapped by an interpreted object. A hybrid object is managed by an interpretative runtime engine via the interpreted object but includes natively executable code within the native object. As used herein, a cloned object refers to, in addition to its ordinary meaning, an object that is a copy of another object.

At least some examples disclosed herein involve user-interactive programs that implement hybrid objects to overcome at least some of the disadvantages described above. Hybrid objects combine the execution efficiency of natively executable code with the robust functionality and ease of development associated with interpreted code. In some examples, the native object processes file access, user input, and rendering tasks—all of which benefit substantially from being implemented within natively executable code. The interpreted object executes other processes including those that leverage the functionality of the runtime engine.

In some examples, the user-interactive program maintains the hybrid objects within a hierarchy that is structured to reflect the work performed by the program. In these examples, the hierarchy of object may grow to a point where operations that access the entire hierarchy may take substantial processor time to complete. Examples of such protracted operations include save/autosave operations, export operations, rendering/rasterization operations, and data/format conversion operations. To prevent and/or decrease latency introduced by execution of protracted operations, the user-interactive programs described herein create a distinct copy of the hierarchy of objects and execute the protracted operation on the copy via a distinct runtime engine thread. This approach enables the reuse of existing code to execute protracted operations, but without the unexpected latency that can result in some situations (e.g., during execution of an autosave function).

In certain examples, to create the distinct copy of the hierarchy of objects, the user-interactive program first clones the native objects within the original hierarchy of objects. In some examples, the user-interactive program clones each native object by executing a copy constructor, or similar function, associated with each native object. Next, the user-interactive program starts a distinct runtime engine thread and creates, via the distinct thread, interpreted objects to house each native object. To complete the copy of the hierarchy of objects, the user interactive program wraps, via the distinct thread, each native object within its corresponding interpreted object. To wrap a native object within an interpreted object, the user-interactive program instantiates the interpreted object and stores a reference to the native object within the interpreted object. In some examples, the interpreted object has methods and/or properties through which methods and/or properties of the native object can be accessed. In some examples, the interpreted objects may further include transient properties with a useful lifetime that is limited to each execution of the user-interactive program.

Once the copy of the hierarchy of objects is complete, the user-interactive program initiates execution of the protracted operation. The protracted operation can be implemented by interpreted instructions without causing additional latency and without corruption of the original hierarchy of hybrid objects.

In some examples, the runtime engine is a V8 JavaScript engine. In these examples, each interpreted object may include one or more properties that are cached versions of corresponding properties in the native object wrapped by the interpreted object. These cached versions can be referred to by the runtime engine without accessing the corresponding property in the native object. This design enhances execution performance of the interpreted objects but requires that all changes to the corresponding properties in a native object be made only through its wrapper interpreted object.

While the approach described above may seem counterintuitive because of the introduction of a redundant, distinct copy of the hierarchy of objects, test results show that this approach does, in fact, decrease latency as illustrated in Table 1.

TABLE 1

| Total time | Small (40 kB) | Medium (350 kB) | Large (5 MB) |
| --- | --- | --- | --- |
| User waits (autosave) | <1 ms | ~1 ms | 19 ms |
| User waits (save) | ~6 ms | 29 ms | 300 ms |

Table 1 lists latency periods associated with an autosave operation and a save operation when executed on small, medium, and large hierarchies of objects. The autosave operation implements the techniques described herein. The save operation does not implement the techniques described herein. As can be seen from Table 1, the latency period for a save operation is substantially more than the latency period for an autosave operation, especially at large hierarchy sizes. These tests were executed using Adobe® XD on a 2014 MacBook Pro with 2.5 GHz i7, 16 GB memory and 500 GB SSD.

Still other aspects, examples and advantages of these aspects and examples, are discussed in detail below. Moreover, it is to be understood that both the foregoing information and the following detailed description are merely illustrative examples of various aspects and examples and are intended to provide an overview or framework for understanding the nature and character of the claimed aspects and examples. References to "an example," "other examples," "some examples," "an alternate example," "various examples," "one example," "at least one example," "another example," "this and other examples" or the like are not necessarily mutually exclusive and are intended to indicate that a particular feature, structure, or characteristic described in connection with the example may be included in at least one example. The appearances of such terms herein are not necessarily all referring to the same example. Any examples disclosed herein may be combined with any other example.

Also, the phraseology and terminology used herein is for the purpose of description and should not be regarded as limiting. Any references to examples, examples, components, elements, or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

System Architecture

Various examples disclosed herein implement a background process within one or more programmable devices. These programmable devices may include any device that processes information. Examples of common programmable devices include personal computers, workstations, servers, cellular telephones, and personal digital assistants. FIG. 1 illustrates one example of a programmable device 100. As shown in FIG. 1, the programmable device 100 includes a processor 124, a memory 126, an interconnection mechanism 128, one or more interfaces 130, a user-interactive program 106, and an interpretative runtime engine 108 (e.g., a V8 JavaScript engine).

As illustrated in FIG. 1, the programmable device 100 includes a suite of components that are standard for a programmable device. These components are the interpretative runtime engine 108, the processor 124, the memory 126, the interconnection mechanism 128, and the interfaces 130. The particular manufacturer and model of any standard component may vary between the examples disclosed herein.

The interfaces 130 include one or more physical interface devices such as input devices, output devices, and combination input/output devices and a software stack configured to drive operation of the devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, accelerometers, network interface cards, etc. Interface devices allow programmable devices to exchange information and to communicate with external entities, such as users and other systems.

The interconnection mechanism 128 is a communication coupling between the processor 124, the memory 126, and the interfaces 130. The interconnection mechanism 128 may include one or more physical busses in conformance with specialized or standard computing bus technologies such as IDE, SCSI, PCI, and InfiniBand. The interconnection mechanism 128 enables communications, including instructions and data, to be exchanged between the processor 124, the memory 126, and the interfaces 130.

The memory 126 includes readable and/or writeable data storage that stores programs and data used or manipulated during operation of a programmable device. The programs stored in the memory 126 are a series of instructions that are executable by the processor 124. The memory 126 may include relatively high performance data storage, such as registers, caches, dynamic random access memory, and static memory. The memory 126 may further include a relatively low performance, non-volatile data storage medium such as flash memory or an optical or magnetic disk. Various examples may organize the memory 126 into particularized and, in some cases, unique structures to store data in support of the components disclosed herein. These data structures may be specifically configured to conserve storage space or increase data exchange performance and may be sized and organized to store values for particular data and types of data.

To implement specialized components of some examples, the processor 124 executes a series of instructions (i.e., one or more programs) that result in manipulated data. The processor 124 may be any type of processor, multiprocessor, microprocessor, or controller known in the art. The processor 124 is connected to and communicates data with the memory 126 and the interfaces 130 via the interconnection mechanism 128. In operation, the processor 124 causes data to be read from a non-volatile (i.e., non-transitory) data storage medium in the memory 126 and written to high performance data storage. The processor 124 manipulates the data within the high performance data storage and copies the manipulated data to the data storage medium after processing is completed.

The interpretative runtime engine 108 can be a hardware or software components that executes interpreted code, such as a V8 JavaScript engine. In some examples, the interpretative runtime engine 108 is single-threaded and executes interpreted code on a line by line basis.

In addition to the standard suite of components described above, the user-interactive device 100 includes customized components. For example, as shown in FIG. 1, these customized components include the user-interactive program 106.

In some examples, the processor 124 is configured to implement the user-interactive program 106. The user-interactive program 106 may be any of a variety of different computer programs, such as applications, operating system components, and so forth. In some examples, the user-interactive program 106 is a video editing program configured to capture, edit, or otherwise manipulate data descriptive of images and/or video (e.g., multiple image frames). When executing according to its configuration, the user-interactive program 106 receives user input that identifies various actions to be executed on the data such as by adding to the data, removing parts of the data, modifying parts of the data, and so forth. In this way, lines, patterns, shapes or other items may be added, opacity of images may be increased or decreased, colors may be changed, various other filters may be applied to change the appearance of images, and so forth.

Figure 2:
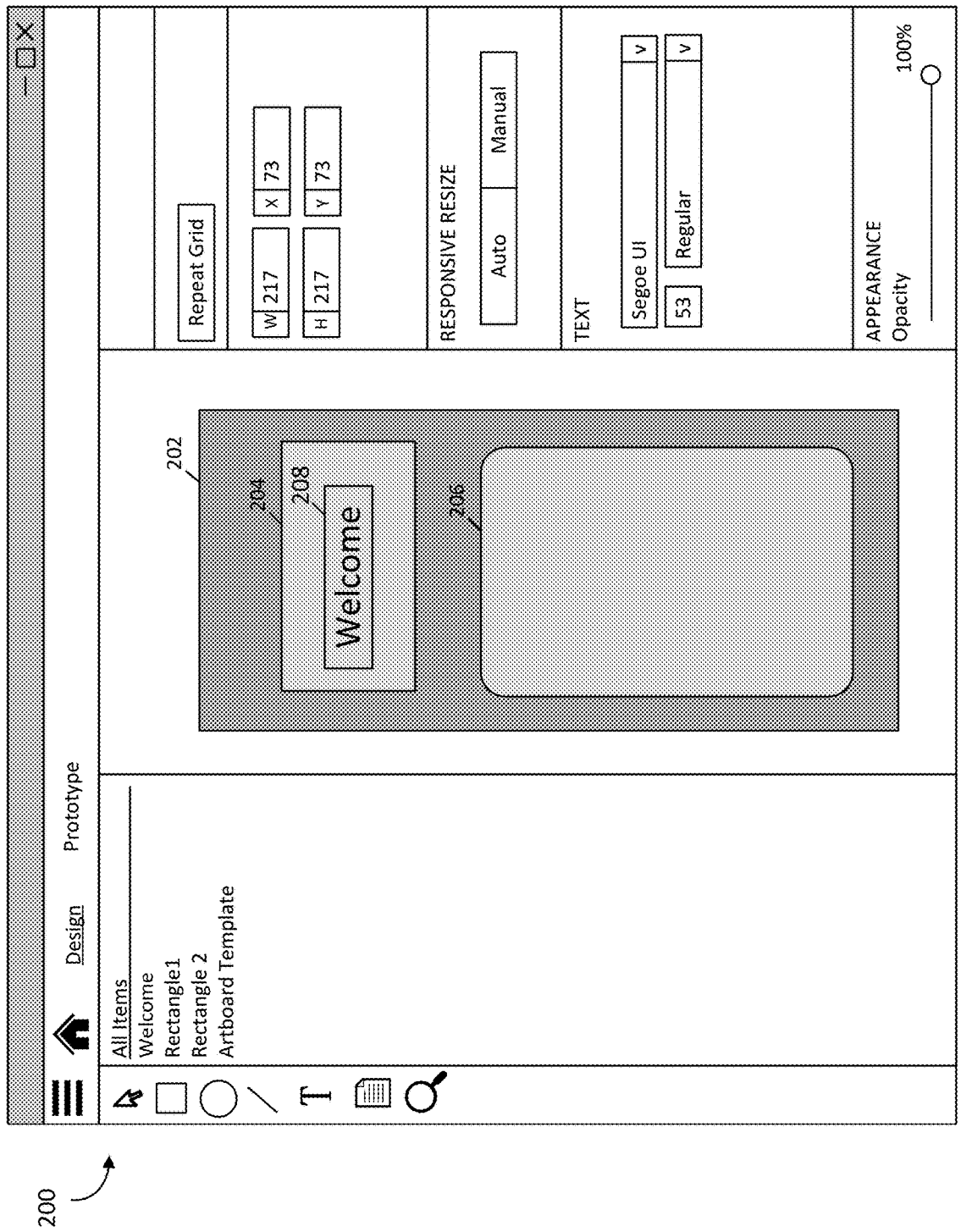
FIG. 2 is a front view of a user interface provided by a particular example of a user-interactive program (i.e., a user experience (UX) design program) in accordance with one or more examples of the present disclosure.

The user-interactive program 106 may alternatively be another type of program, such as a user experience (UX) design program that enables a user to design user interfaces for smart phone apps and other programs. In these examples, the user-interactive program 106 is configured to provide a user interface through which a user can create and modify artboards that include one or more items. Additionally or alternatively, the user interface can further allow a user to assign actions to the items and/or establish a workflow between items. Artboards are visual components that correspond to screens within a user interface under construction. Items are also visual components and correspond to controls to be located with the screens of the user interface. FIG. 2 illustrates a user interface 200 provided by one example of a user-interactive program 106 that is a UX design program. A user (e.g., the user 102) can interact with the user interface 200 of the UX design program to build an app to execute, for example, on a smart phone.

As shown in FIG. 2, the user interface 200 includes a wide variety of controls and design elements. For example, the user interface 200 includes an artboard 202. The artboard 202 corresponds to a splash screen that will be displayed when the app is opened. The artboard 202 includes two rectangle items 204 and 206. The rectangle item 204 includes a text item 208. By interacting with the various controls provided within the user interface 200, the user can add modify one or more of the items 204-208, add additional items to the artboard 202, and/or add additional artboards with different items. Moreover, the user can interact with the user interface 200 to create a workflow between artboards and to embed additional functionality into the artboards and items. The workflow and additional functionality will be exhibited by the app during prototyping and eventual execution.

Returning to FIG. 1, in some examples, the user-interactive program 106 is configured to programmatically manage the artboards and items via a hierarchy of objects that correspond to the artboards and items. The hierarchy of objects can be stored in a memory (e.g., the memory 126). In these examples, the user-interactive program 106 is configured to record user manipulation of the artboards and items within the user interface as changes to the underlying objects that represent the artboards and items.

The user-interactive program 106 can be configured to execute in a variety of execution environments. For instance, in some examples, the user-interactive program 106 is compiled into object code that is natively executable by a hardware processor (e.g., the processor 124). In these examples, the user-interactive program 106 may execute with support from, and under the control of, an operating system executed by the programmable device. Alternatively or additionally, in some examples, the user-interactive program 106 is store as intermediate code that is interpreted at runtime, by a runtime engine, into object code that is then natively executed by the hardware processor. The intermediate code may or may not be human-readable, but in at least some examples the intermediate code is actually source code. It should be noted that execution environments that support various examples of the user-interactive program 106 can include one or more of a hardware processor, an operating system, and/or a browser.

In some examples, the objects maintained by the user-interactive program 106 include native objects and/or interpreted objects. Native objects are implemented using object code that is natively executable. Interpreted objects are implemented using intermediate code that requires interpretation via a runtime engine prior to native execution. As such, native objects tend to execute more efficiently than interpreted objects because the native objects need not be interpreted by a runtime engine prior to execution. However, native objects are less portable than interpreted objects because the native objects are coded for specific hardware and/or operating systems. The interpreted objects are more portable because they are coded for specific runtime engines. The runtime engines shield the interpreted objects from the need to code for specific hardware and/or operating systems. In at least some examples, native objects are compiled from C++ code and interpreted objects are written in JavaScript.

Figure 3:
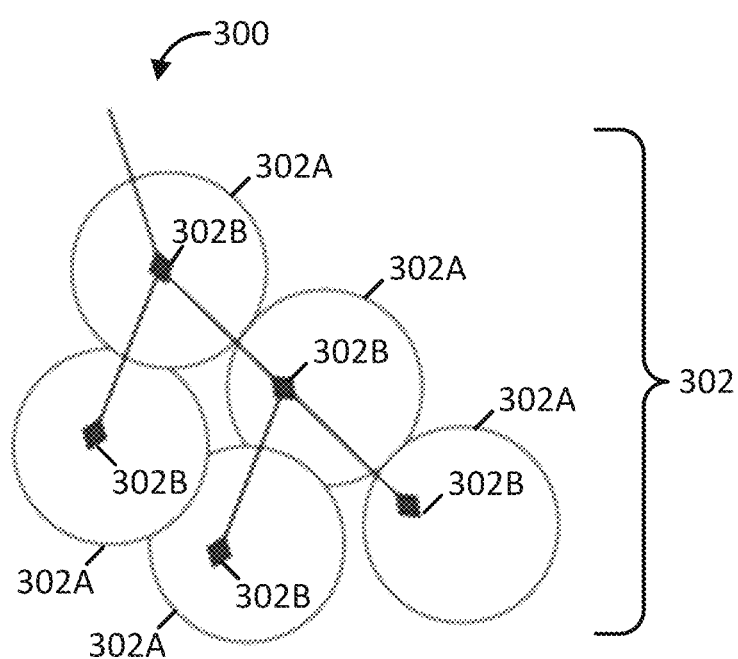
FIG. 3 is a schematic view of a hierarchy of hybrid objects generated by a user-interactive program in accordance with one or more examples of the present disclosure.

In certain examples, the user-interactive program 106 is configured to implement a mixed set of native objects and interpreted objects. In these examples, the user-interactive program 106 encapsulates hardware-focused features (e.g., rendering graphics) within the native objects, so as to benefit from their efficient execution. Also, in these examples, the user-interactive program 106 encapsulates less hardware-focused features in interpreted objects, so as to benefit from their portability and ease of reuse. Further, in at least one example, the user-interactive program 106 wraps native objects with interpreted objects to leverage the strengths of each type of object. FIG. 3 illustrates a graph 300 of a hierarchy of objects implemented by a user-interactive program 106 configured in accord with this example.

As shown in FIG. 3, the graph 300 includes a group of nodes 302 that each correspond, for example, to an artboard or an item as described above with reference to FIG. 2. Each node of the group of nodes 302 represents a hybrid object that includes a native object 302B that is wrapped by an interpreted object 302A. Each of the native objects 302B include a set of methods and properties. In some examples, each of the interpreted objects 302A has attributes that can provide access to the set of methods and properties of the native object 302B that is wrapped by the interpreted object 302A. For instance, in at least one example, each of the interpreted objects includes a set of methods and properties that corresponds and/or provides access to the set of methods and properties of the native object 302B wrapped by the interpreted object 302A. In some examples, each interpreted object 302A includes a set of persistent properties and a set of transient properties. Persistent properties are to be stored in non-volatile data storage when the object is saved. Examples of persistent properties include the name of an artboard and identifiers of items the artboard contains. Transient properties need not be stored in non-volatile data storage when the object is saved. Examples of transient properties include whether an artboard or item is currently selected within the user interface. In some examples, each native object 302B includes a set of properties that corresponds to the persistent properties of interpreted object 302A that wraps the native object 302B. This configuration enables a full hierarchy of hybrid objects to be generated from an underlying set of native objects.

In some examples where the interpreted objects are managed by a V8 JavaScript engine, each of the interpreted objects that wraps a native object implements an added layer of caching to enhance the overall performance of the hybrid objects. More specifically, in these examples, rather than exposing properties of the underlying native object as properties of the interpreted object, each interpreted object implements getter/setter methods to access the properties of the native object. However, each of these getter/setter methods accesses a "cached" property of the interpreted object where no change is being made to the underlying native object property. This enables the interpreted objects to avoid accessing properties in the native object unless the value of that property is being changed. By avoiding access to the native object, this approach enables "cached" properties of the interpreted object to benefit from hidden classes and inline caching optimizations that are implemented within the V8 JavaScript engine.

Returning to FIG. 1, in some examples, the user-interactive program 106 is configured to offload protracted operations that require substantial processing time to complete. Such offloading can be particular important where, for example, the protracted operation would otherwise impact user responsiveness of the user-interactive program 106.

What constitutes substantial processing time can vary between examples, but in some examples processing time that is human perceptible (e.g., greater than 16 milliseconds) is considered substantial. Examples of protracted operations can include processes that save, export, rasterize, and/or convert data being processed by the user-interactive program 106, especially where the amount of data being processed is substantial (e.g., greater than 4 megabytes for some programmable devices). In some examples, the user-interactive program 106 is configured to execute protracted operations in response to receipt of user input (e.g., by a user selecting a save control within the user interface) and/or in response to autonomous features of the user-interactive program 106 (e.g., crash recovery autosave or the like). In these examples, when executing according to its configuration, the user-interactive program 106 executes an interactive process described further below with reference to FIG. 4.

In some examples, the user-interactive program 106 is configured to minimize any latency experienced by the user by creating a distinct copy of the data being processed by the user-interactive program prior to executing a protracted operation against the data. In these examples, when executing according to its configuration, the user-interactive program 106 executes a background process described further below with reference to FIG. 5.

In some examples, the components disclosed herein may create, read, update, and delete parameters that affect the functions performed by the components. These parameters may be physically stored in any form of suitable memory including volatile memory or non-volatile memory. In addition, the parameters may be logically stored in a propriety data structure (such as a database or file defined by a user space application) or in a commonly shared data structure (such as an application registry that is defined by an operating system). In addition, some examples provide for both system and user interface components that allow external entities to modify the parameters and thereby configure the behavior of the components.

Although an example implementing particular functionality is discussed herein with reference to particular components, it should be noted that, in other examples, the functionality of individual components can be separated into multiple components, and/or at least some functionality of multiple components can be combined into a single component. Information may flow between the any of the components described herein using a variety of techniques. Such techniques include, for example, passing the information over a network using standard protocols, such as TCP/IP or HTTP or HTTPS, and passing the information between components via data structures written in shared volatile or non-volatile memory. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and examples disclosed herein.

Although the user-interactive device 100 is shown by way of example as a type of programmable device capable of executing the processes disclosed herein, examples are not limited to being implemented on the programmable devices shown in FIG. 1. Various processes may be practiced on one or more programmable devices having a different architectures or components than those shown in FIG. 1. For instance, a programmable device may include specially programmed, special-purpose hardware, such as an application-specific integrated circuit (ASIC), a field-programmable gate array (FPGA), a complex programmable logic device (CPLD), and other implementations in silicon or other hardware tailored to execute processes disclosed herein. Thus, components of a programmable device as disclosed herein may be implemented in software, hardware, firmware, or any combination thereof.

Methodology

As described above, some examples execute interactive processes to enable a user to perform any of a wide variety of activities. For instance, in at least one example, a programmable device (e.g., the programmable device 100) implements a user-interactive program (e.g., the user-interactive program 106) which, in turn, executes an interactive process 400 illustrated in FIG. 4.

Figure 4:
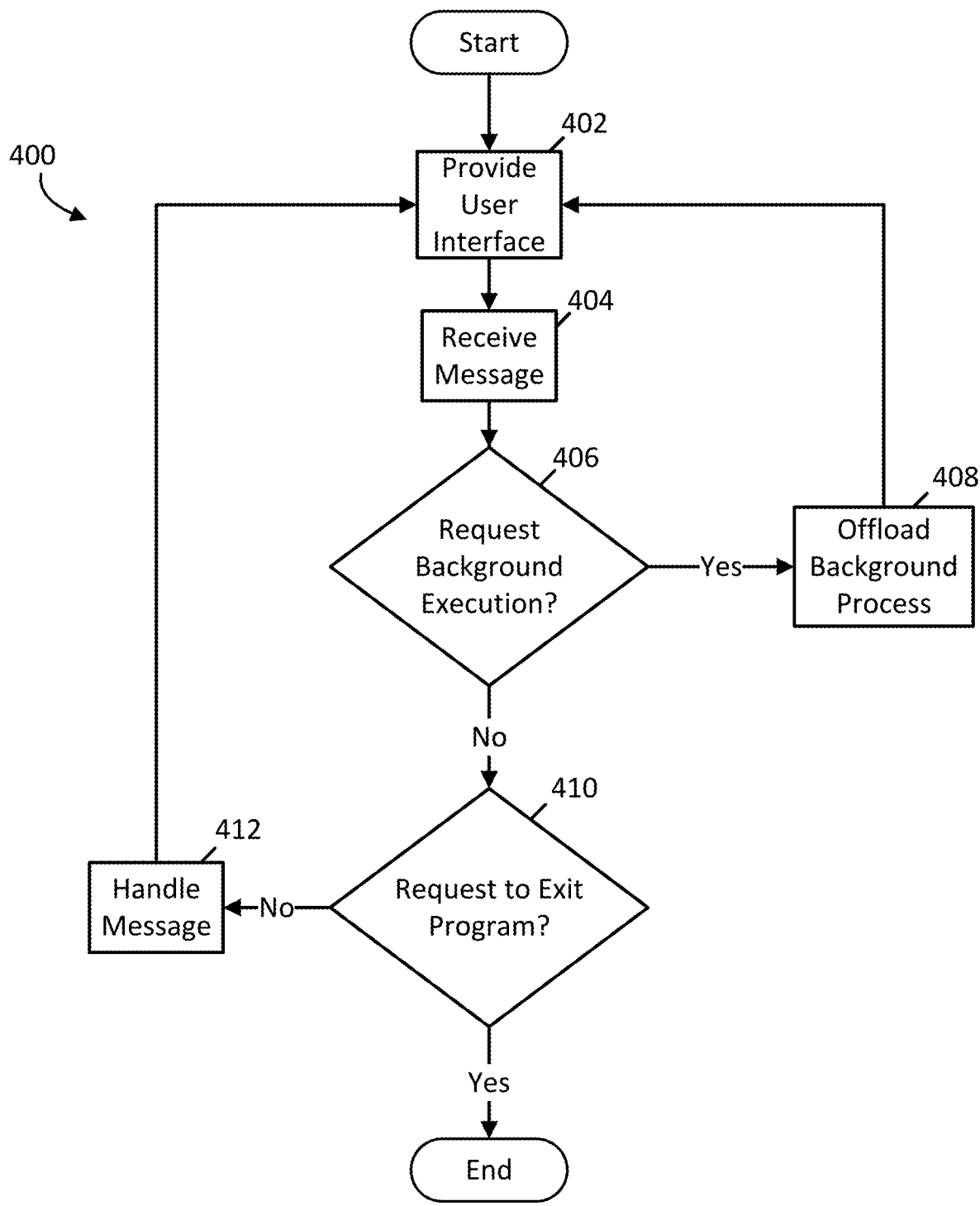
FIG. 4 is a flowchart illustrating an example interactive process in accordance with one or more examples of the present disclosure.

As shown in FIG. 4, the interactive process 400 starts with the user-interactive program providing 402 a user interface (e.g., the user interface 200 via one of the interfaces 130) to a user (e.g., the user 102). As described above, the attributes and content of the user interface varies depending on the functionality implemented by the user-interactive program 106. However, in at least one example, the user interface comprises screens and controls that enable a user to create, edit, and delete one or more artboards that include one or more items. In this example, the user interface also enables the user to specify a workflow involving the artboards and items and other functionality specific to the artboards and items. Together, the artboards, items, and workflow collectively define the design of a user interface of an app that is under construction.

Next, the user-interactive program receives 404 a message from its execution environment. The user-interactive program determines 406 whether it has received a message that includes a request to execute one or more interpreted, protracted operations. In some examples, the user-interactive program determines 406 whether the message includes such a request by parsing the message, identifying a payload, and accessing a cross-reference. This cross-reference can store associations that specify how particular payloads are to be handled. For example, the message can include a payload storing an identifier of an event or a control selected by a user. This identifier can be associated with a save, export, rasterize, and/or data conversion process in the cross-reference, thereby configuring the user-interactive program to handle a message including the identifier by executing the associated process. Examples of events that may be associated with an interpreted, protracted operations include expiration of an timers (e.g., an autosave timer) and imminent shut down of the execution environment. Examples of controls that may be associated with an interpreted, protracted operation include button, sliders, checkboxes, and other actuatable controls.

Where the user-interactive program determines 406 that it has received a message including a request to execute an interpreted, protracted operation, the user-interactive program offloads 408 the interpreted, protracted operation to a background processing thread. One example of a background process executed by the user-interactive program to offload 408 the interpreted, protracted operation is described further below with reference to FIG. 5. After offloading 408 the interpreted, protracted operation, the user-interactive program returns to providing 402 the user interface.

Where the user-interactive program determines 406 that it has not received a message including a request to execute an interpreted, protracted operation, the user-interactive program determines 410 whether the message includes a request to exit the program. Where the user-interactive program determines 410 that the message includes a request to exit the program, the user-interactive program ends the interactive process 400 and terminates execution. Where the user-interactive program determines 410 that the message does not include a request to exit the program, the user-interactive program handles 412 the message in accordance with its configuration and returns to providing 402 the user interface. For example, where the message includes a request to create a new artboard, the user-interactive program constructs a new artboard object and updates the user interface to display a new artboard.

As described above, some examples execute background processes to allow a user-interactive program (e.g., the user-interactive program 106) to offload interpreted, compute intense processes and thereby minimize latency experienced by the user. For instance, in at least one example, a programmable device (e.g., the programmable device 100) implements the user-interactive program which, in turn, executes a background process 500 illustrated in FIG. 5.

The background process 500 starts with the user-interactive program determining 502 whether a previously initiated background thread exists. In some examples, at least portions of the background process 500 involve execution of interpreted objects. As such, in these examples, the background thread must be a runtime engine thread that supports interpretation of interpreted objects. However, in some examples, the user-interactive program need only create the runtime engine thread a single time and can then make use of the same thread for subsequent iterations of the background process 300. Where the user-interactive program determines 502 that no background thread exists, the user-interactive program initiates 504 a background thread (e.g., a V8 JavaScript worker thread).

Where the user-interactive program determines 502 that a background thread exists, the user-interactive program clones 506 the native objects present in the hierarchy of objects implemented by the user-interactive program. In some examples, the user-interactive program clones 506 native objects by generating new instances of the native objects via a copy constructor method within the native objects.

Next, the user-interactive program wraps 508 the native objects into interpreted objects. In some examples, the user-interactive program wraps 508 the native objects by instantiating, via the runtime engine, an interpreted object for each native object to be wrapped and storing, within each interpreted object, a reference to its corresponding native object. In some examples, the interpreted object has methods and/or properties through which methods and/or properties of the native object can be accessed and modified.

Figure 6:
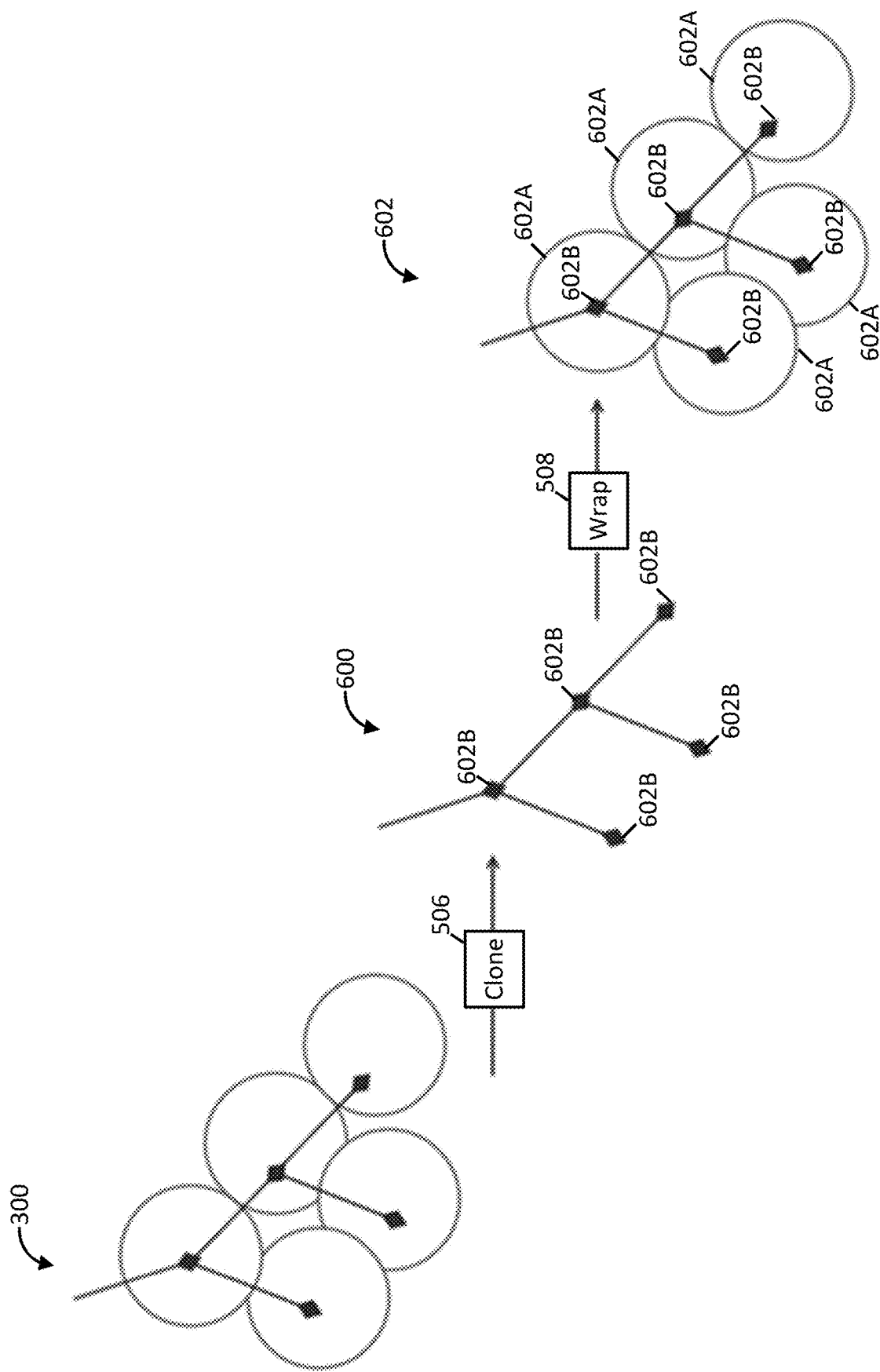
FIG. 6 is a series of schematic views of hierarchies of hybrid objects generated by a user-interactive program in accordance with one or more examples of the present disclosure.

FIG. 6 illustrates cloning 506 and wrapping 508 within the context of the object hierarchies involved with these actions. As shown in FIG. 6, the original hierarchy 300 of wrapped objects is first cloned 506 to produce a new hierarchy 600 of native objects 602B. Next, new hierarchy 600 is wrapped 508 to produce a new hierarchy 602 of wrapped objects that includes both native objects 602B and interpreted objects 602A. The new wrapped hierarchy 602 is now ready for further processing by any operation that does not require access to the original hierarchy 300 of active, wrapped objects.

Returning to FIG. 5, the user-interactive program executes 510 a background operation via the background thread. The background operation can be any operation that does not require access to active objects. In most situations, the background operation is also a protracted operation, although this is not a requirement. Upon completion of execution 510 the background operation, the user-interactive program optionally acknowledges, via the background thread, completion of the background operation and ends the background process 500.

Figure 7:
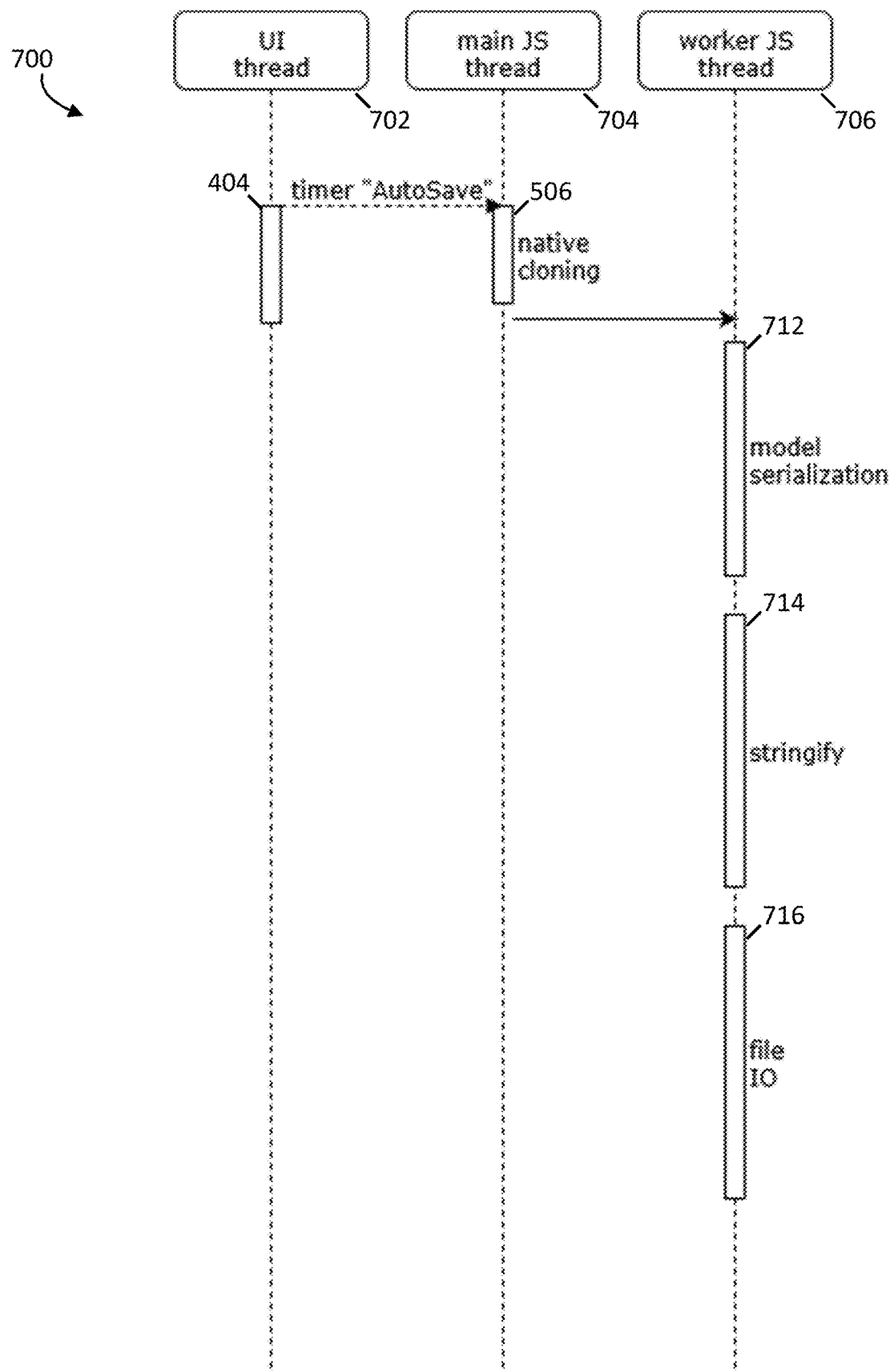
FIG. 7 is a sequence diagram illustrating an autosave process executed by a user-interactive program in accordance with one or more examples of the present disclosure.

In at least one example, a user-interactive program (e.g., the user-interactive program 106) uses the techniques described above to execute an autosave operation in the background to minimize any latency experienced by a user (e.g., the user 102). FIG. 7 illustrates this example.

Figure 5:
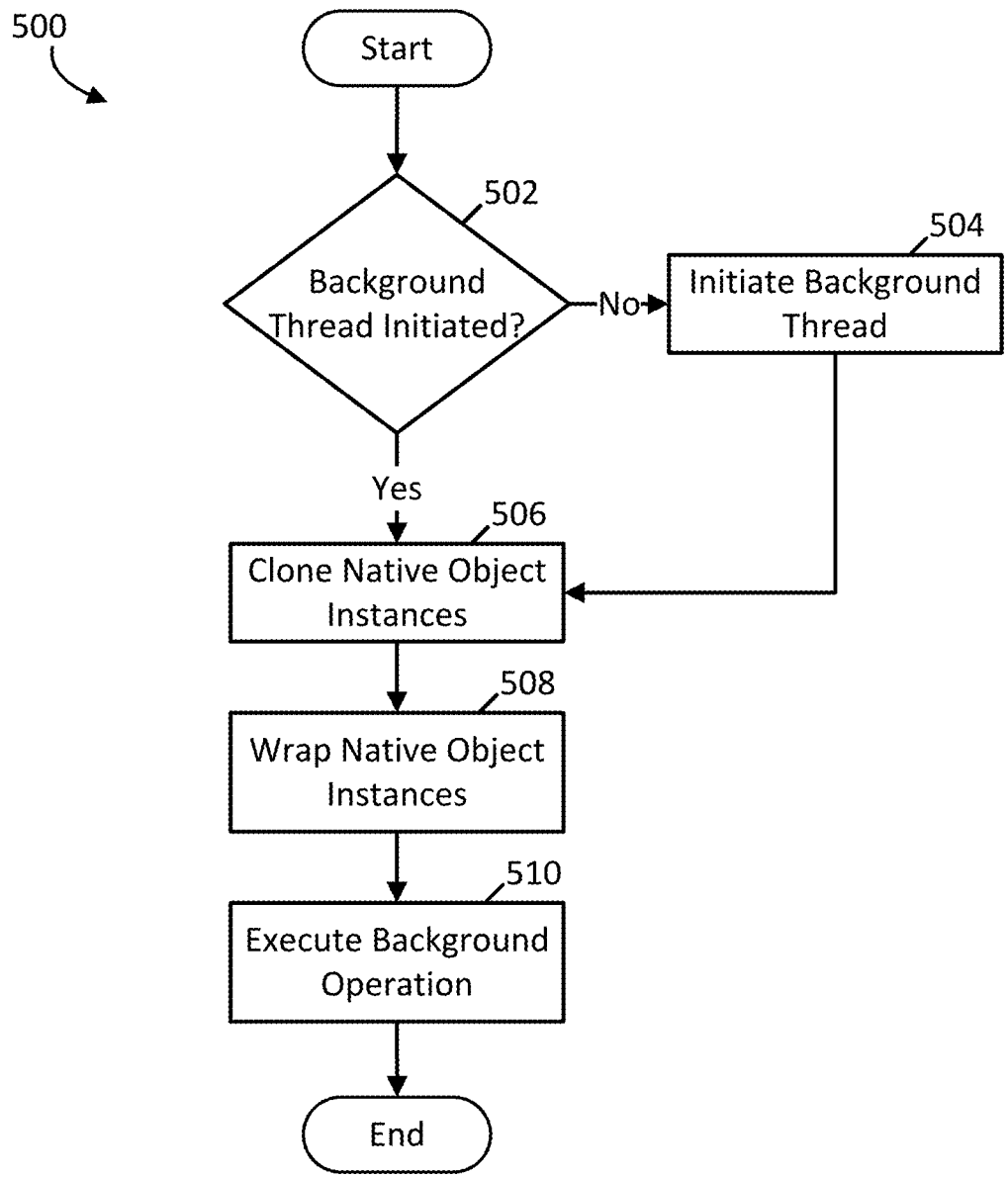
FIG. 5 is a flowchart illustrating an example background process in accordance with one or more examples of the present disclosure.

As shown in FIG. 7, with combined reference to FIGS. 4 and 5, a user interface thread 702 receives 404 a message that indicates expiration of an autosave timer of the user-interactive program. In response to reception of the message, the user interface thread 702 provides the message to a main JavaScript thread 704 for processing. The main JavaScript thread 704 determines 406 that this message is a request for background execution. The main JavaScript thread 704 offloads 408 the autosave operation by executing a background process.

The main JavaScript thread 704 determines 502 that no background thread exists and in response initiates 504 a worker JavaScript thread 706. The main JavaScript thread 704 clones 506 the native objects in the object hierarchy of the user-interactive program. After cloning 506 is complete, the main JavaScript thread 704 can return to processing message from the UI thread 702. Thus any latency being experienced by the user stops after cloning 506 is complete. The worker JavaScript thread wraps 508 the native objects with interpreted objects and executes 510 the autosave operation in the background.

As shown in FIG. 7, the worker JavaScript thread 706 serializes 712 each object in the hierarchy of objects. Serialization readies each object to be rendered as text. The worker JavaScript thread 706 stringifies 714 each object to render it as text. More specially, in some examples, the worker JavaScript thread 706 renders each object in JavaScript Object Notation. The worker JavaScript thread 706 also stores 716 each object, rendered in JSON, in non-volatile storage.

To serialize 712, stringify 714, and persistently store 716, a hierarchy of objects can take considerable time. For instance, where the overall size of the hierarchy is 5 megabytes, this combination of functions can consume 300 milliseconds or more. Thus, by offloading these functions to background processing, the examples disclosed herein save the user time and frustration, especially where the functions are executed frequently, as is the case with autosave operations.

Each of the processes described herein depict one particular sequence of acts in a particular example. The acts included in these processes may be performed by, or using, one or more programmable devices specially configured as discussed herein. Some acts are optional and, as such, may be omitted in accord with one or more examples. Additionally, the order of acts can be altered, or other acts can be added, without departing from the scope of the examples discussed herein. Furthermore, as discussed above, in at least one example, the acts are performed on a particular, specially configured machine, namely a user-interactive device configured according to the examples and examples disclosed herein.

Further Example Examples

Numerous variations and configurations will be apparent in light of this disclosure. These numerous variations and configuration can include one or more of the following features. For instance, in one example, a programmable device is provided. The programmable device includes a memory and at least one processor coupled to the memory. The memory stores a plurality hybrid objects. Each hybrid object of the plurality of hybrid objects includes a native object wrapped by an interpreted object. The at least one processor can be coupled to the memory. The at least one processor can be configured to identify a message to execute an operation on one or more hybrid objects of the plurality of hybrid objects; clone, in response to reception of the message, each native object within the one or more hybrid objects to create one or more cloned native objects; wrap each cloned native object of the one or more native objects with a new interpreted object to create one or more new hybrid objects; and execute the operation on the one or more new hybrid objects.

In the programmable device, the operation can include a save operation, an autosave operation, an export operation, a rasterization operation, and/or a conversion operation. The at least one processor can be further configured to execute a first thread to identify the message and clone each native object and to execute a second thread to wrap each cloned native object and execute the operation. The new interpreted object can have one or more methods and/or one or more properties to provide access one or more methods and/or one or more properties of the cloned native object. Further, to wrap can include to instantiate the new interpreted object and to store, within the new interpreted object, a reference to a cloned native object. Each interpreted object within the one or more hybrid objects can include a set of persistent properties and a set of transient properties and the one or more properties of the cloned native object can correspond to the set of persistent properties.

In the programmable device, each native object within the one or more hybrid objects can include natively executable instructions to render a graphical representation of the native object. The at least one processor can be further configured to manage each interpreted object within the one or more hybrid objects using a runtime engine. The runtime engine can be single-threaded. To execute the operation can include to execute the operation via the runtime engine. The runtime engine can be a JavaScript runtime engine. Each interpreted object within the one or more hybrid objects can include at least one property that is a cached version of at least one corresponding property of the native object wrapped by the interpreted object.

In another example, a method of executing an interpreted background process using a programmable device is provided. The method include acts of storing, by the processor in the memory, a plurality hybrid objects, each hybrid object of the plurality of hybrid objects comprising a native object wrapped by an interpreted object; identifying, by the processor, a message to execute an operation on one or more hybrid objects of the plurality of hybrid objects; cloning, by the processor in response to reception of the message, each native object within the one or more hybrid objects to create one or more cloned native objects; wrapping, by the processor, each cloned native object of the one or more native objects with a new interpreted object to create one or more new hybrid objects; and executing, by the processor, the operation on the one or more new hybrid objects.

The method can further include an act of executing a first thread to identify the message and clone each native object; and an act of executing a second thread to wrap each cloned native object and execute the operation. The new interpreted object can have one or more methods and/or one or more properties to access one or more methods and/or one or more properties of the cloned native object. The act of wrapping each cloned native object can include acts of instantiating the new interpreted object; and storing, within the new interpreted object, a reference to a cloned native object.

The method can further include an act of managing each interpreted object within the one or more hybrid objects using a runtime engine. In the method, the act of using the runtime engine can include an act of using a runtime engine that is single-threaded. In the method, the act of executing the operation can include an act of executing the operation via the runtime engine.

In another example, a non-transitory data storage medium is provided. The data storage medium stores instructions executable by a programmable device. The instructions are configured to execute a process to execute a background operation. The process includes storing a plurality hybrid objects, each hybrid object of the plurality of hybrid objects comprising a native object wrapped by an interpreted object; identifying a message to execute an operation on one or more hybrid objects of the plurality of hybrid objects; cloning, in response to reception of the message, each native object within the one or more hybrid objects to create one or more cloned native objects; wrapping each cloned native object of the one or more native objects with a new interpreted object to create one or more new hybrid objects; and executing the operation on the one or more new hybrid objects.

The process can further include executing a first thread to identify the message and clone each native object; and executing a second thread to wrap each cloned native object and execute the operation. The new interpreted object can have one or more methods and/or one or more properties to provide access one or more methods and/or one or more properties of the cloned native object. In the process, wrapping each cloned native object can include instantiating the new interpreted object and storing, within the new interpreted object, a reference to a cloned native object.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure and are intended to be within the scope of the examples discussed herein. Accordingly, the foregoing description and drawings are by way of example only.

The invention claimed is:

1. A programmable device comprising:
   a memory storing a plurality of hybrid objects, each hybrid object of the plurality of hybrid objects comprising a native object wrapped by an interpreted object; and
   at least one processor coupled to the memory and configured to:
      identify a message to execute a background operation on one or more hybrid objects of the plurality of hybrid objects;
      clone, in response to reception of the message, each native object within the one or more hybrid objects to create one or more cloned native objects;
      wrap each cloned native object with a new interpreted object to create one or more new hybrid objects; and
      execute the background operation, via a background thread, on the one or more new hybrid objects.

2. The programmable device of claim 1, wherein the background operation is a save operation, an autosave operation, an export operation, a rasterization operation, and/or a conversion operation.

3. The programmable device of claim 1, wherein the at least one processor is further configured to:
   execute a first thread to identify the message and clone each native object; and
   execute a second thread to wrap each cloned native object and execute the background operation, wherein the second thread is the background thread.

4. The programmable device of claim 1, wherein the new interpreted object has one or more methods and/or one or more properties to provide access to one or more methods and/or one or more properties of a particular one of the cloned native objects, and to wrap comprises:
   to instantiate the new interpreted object; and
   to store, within the new interpreted object, a reference to the particular cloned native object.

5. The programmable device of claim 4, wherein each interpreted object within the one or more hybrid objects comprises a set of persistent properties and a set of transient properties and the one or more properties of the particular cloned native object correspond to the set of persistent properties.

6. The programmable device of claim 1, wherein each native object within the one or more hybrid objects comprises natively executable instructions to render a graphical representation of the native object.

7. The programmable device of claim 1, wherein the at least one processor is further configured to manage each interpreted object within the one or more hybrid objects using a runtime engine.

8. The programmable device of claim 7, wherein the runtime engine is single-threaded.

9. The programmable device of claim 8, wherein to execute the background operation comprises to execute the background operation via the runtime engine.

10. The programmable device of claim 9, wherein the runtime engine is a JavaScript runtime engine.

11. The programmable device of claim 10, wherein each interpreted object within the one or more hybrid objects comprises at least one property that is a cached version of at least one corresponding property of the native object wrapped by the interpreted object.

12. A method of executing an interpreted background process using a programmable device comprising a memory and at least one processor, the method comprising:
   storing, by the processor, in the memory, a plurality of hybrid objects, each hybrid object of the plurality of hybrid objects comprising a native object wrapped by an interpreted object;
   identifying, by the processor, a message to execute a background operation on one or more hybrid objects of the plurality of hybrid objects;
   cloning, by the processor, in response to reception of the message, each native object within the one or more hybrid objects to create one or more cloned native objects;
   wrapping, by the processor, each cloned native object with a new interpreted object to create one or more new hybrid objects; and
   executing, by the processor, via a background thread, the background operation on the one or more new hybrid objects.

13. The method of claim 12, wherein the method further comprises:
   executing a first thread to identify the message and clone each native object; and
   executing a second thread to wrap each cloned native object and execute the background operation, wherein the second thread is the background thread.

14. The method of claim 12, wherein the new interpreted object has one or more methods and/or one or more properties to access to one or more methods and/or one or more properties of a particular one of the cloned native objects, and wrapping each cloned native object comprises:
   instantiating the new interpreted object; and
   storing, within the new interpreted object, a reference to the particular cloned native object.

15. The method of claim 12, wherein the method further comprises managing each interpreted object within the one or more hybrid objects using a runtime engine.

16. The method of claim 15, wherein using the runtime engine comprises using a runtime engine that is single-threaded.

17. The method of claim 16, wherein executing the background operation comprises executing the background operation via the runtime engine.

18. A non-transitory data storage medium storing instructions executable by a programmable device, the instructions being configured to execute a process to execute a background operation, the process comprising:
   storing a plurality of hybrid objects, each hybrid object of the plurality of hybrid objects comprising a native object wrapped by an interpreted object;
   identifying a message to execute a background-an-operation on one or more hybrid objects of the plurality of hybrid objects;
   cloning, in response to reception of the message, each native object within the one or more hybrid objects to create one or more cloned native objects;
   wrapping each cloned native object with a new interpreted object to create one or more new hybrid objects; and
   executing the background operation, via a background thread, on the one or more new hybrid objects.

19. The data storage medium of claim 18, the process further comprising:
   executing a first thread to identify the message and clone each native object; and
   executing a second thread to wrap each cloned native object and execute the background operation, wherein the second thread is the background thread.

20. The data storage medium of claim 18, wherein
the new interpreted object has one or more methods and/or one or more properties to provide access to one or more methods and/or one or more properties of a particular one of the cloned native objects, and wrapping each cloned native object comprises:
instantiating the new interpreted object; and
storing, within the new interpreted object, a reference to the particular cloned native object.

* * * * *